United States Patent [19]
Breithor et al.

[11] Patent Number: 6,108,601
[45] Date of Patent: Aug. 22, 2000

[54] METHOD AND APPARATUS FOR THE SYNCHRONIZATION OF TWO ROTATING PARTS

[75] Inventors: Wolf-Christian Breithor, Hemmingen; Erwin Petersen, Wunstorf; Horst Deike, Clauen; Detlef Schmidt; Klaus Lindemann, both of Gehrden, all of Germany

[73] Assignee: WABCO GmbH, Hannover, Germany

[21] Appl. No.: 09/086,828

[22] Filed: May 29, 1998

[30]      Foreign Application Priority Data

Apr. 6, 1997 [DE] Germany ............................ 197 23 324

[51] Int. Cl.⁷ .................................................. B60K 28/16
[52] U.S. Cl. ................................ 701/82; 701/88; 475/150
[58] Field of Search ..................... 701/69, 70, 74, 701/81, 78, 82, 83, 88, 89, 90, 67, 68; 192/87.12, 114 R; 475/150, 160

[56]                References Cited

U.S. PATENT DOCUMENTS

| | | | |
|---|---|---|---|
| 3,927,914 | 12/1975 | Flink et al. ........................... | 303/21 F |
| 4,946,015 | 8/1990 | Browalski et al. ..................... | 192/1.23 |
| 5,103,948 | 4/1992 | Sato et al. ............................. | 192/0.08 |
| 5,441,136 | 8/1995 | Greaves et al. ........................ | 192/13 R |
| 5,839,328 | 11/1998 | Showalter .............................. | 74/650 |

FOREIGN PATENT DOCUMENTS

| | | |
|---|---|---|
| 0 176 529 B11 | 4/1986 | European Pat. Off. . |
| 0 510 457 A1 | 10/1992 | European Pat. Off. . |
| 35 43 894 A1 | 6/1987 | Germany . |
| 35 45 901 A1 | 6/1987 | Germany . |
| 36 14 863 A1 | 11/1987 | Germany . |
| 41 14 047 A1 | 11/1992 | Germany . |
| 37 37 619 C2 | 6/1993 | Germany . |
| 44 09 585 A1 | 7/1995 | Germany . |
| 44 18 773 C1 | 1/1996 | Germany . |
| 44 27 040 A1 | 2/1996 | Germany . |
| 44 33 459 A1 | 3/1996 | Germany . |
| 195 05 561 A1 | 8/1996 | Germany . |

*Primary Examiner*—Tan Nguyen
*Attorney, Agent, or Firm*—Proskauer Rose LLP

[57]                ABSTRACT

In a motor vehicle with one or several driven axles, as well as with corresponding equalizing gears and/or power dividers for the compensation of differences in the speeds of the wheels, the spinning of wheels and/or axles is avoided through the use of braking devices for the braking of individual wheels, in conjunction with locking devices for the above-mentioned equalizing gears and/or power dividers. Upon reaching a predetermined speed difference value between the drive axles, a reduction of this speed difference is first brought about by actuation of the corresponding braking devices. When a predetermined approach tendency of the wheel speeds to each other is reached, a synchronization of the wheels is obtained by actuating the appropriate locking device. In this manner, a synchronization of rotating parts is achieved during any speed behavior of the rotating parts, without damage to parts of the motor vehicle.

14 Claims, 1 Drawing Sheet

METHOD AND APPARATUS FOR THE SYNCHRONIZATION OF TWO ROTATING PARTS

FIELD OF THE INVENTION

The present invention relates to a method and apparatus for the synchronization of two rotating parts. More specifically, the present invention relates to the synchronization of rotating parts in a motor vehicle.

BACKGROUND OF THE INVENTION

This type of method is known from EP 0 510 457 B1, which is incorporated herein by reference.

Methods of this type are preferably used in motor vehicles equipped with equalizing gears and/or power dividers. To avoid spinning of individual drive wheels of the vehicle on smooth road surfaces, the above-mentioned gears, which are for the most part designed as differential gears, are equipped with a locking device, through which the parts which are uncoupled from each other by the gear in normal operation can be rigidly connected to each other.

Such locking devices may be actuated manually by the driver when necessary, or to increase riding comfort and safety, may be actuated automatically by a control signal emitted by a control device, when certain external conditions exist, as detected by sensors.

In the prior art, a locking device for an equalizing gear or a power divider is actuated automatically in the above-described manner, when the difference between the speeds of the rotating parts attached to the output shafts of the gear exceed a predetermined limit value. In order to avoid damage to the locking device or to the gear, this limit value is kept relatively low, i.e., the locking device is actuated at a low difference between the speeds. In the case of a very large difference in speeds, actuation would not be permissible, because damage to the locking device or to the gear would be likely to occur. Therefore, when differences in speeds increase very rapidly, the locking device is not actuated until the difference in speeds is reduced. During this period of time, however, a dangerous driving condition may occur, because of the spinning of individual drive wheels. Depending on external circumstances, this dangerous driving condition may last for an indeterminate, long period of time.

It is therefore an object of the present invention to provide a method and apparatus for the synchronization of two rotating parts, which can be achieved in as short a time as possible, regardless of the speed behavior of the rotating parts, and without incurring any damage to the parts of the motor vehicle.

In the following description, the "synchronization of rotating parts" is to be understood as the adaptation or approach of the speeds of the rotating parts to each other.

The present invention achieves synchronization of the rotating parts in a relatively short period of time, without the occurrence of sudden impacts or jolts, even when the differences between the speeds are very large, or are increasing very rapidly. As a result, damage to gears, the locking device, the rotating parts, or other parts of the motor vehicle are avoided.

Through the use of a braking device, in addition to a locking device, it is possible to adapt the speeds of rotating parts to each other gradually, rather than suddenly. Therefore, spinning of the slower rotating wheel, or wheels, which may occur as a result of sudden synchronization via a locking device, can also be avoided, providing a particularly safe behavior of the vehicle.

In an advantageous further development of the invention, an adaptation value is determined from the speeds in order to ascertain the adaptation or approach tendency of the speeds to each other. When this adaptation value has reached a predetermined limit value, the rotating parts are synchronized through actuation of a locking device. By this, determination of the right moment for actuation of the locking device can be done in a very simple manner. Preferably, a microprocessor is used to determine the adaptation value, and to compare it with the limit value.

The method for determining this adaptation value may consist of a number of different procedures and calculations, so that the method according to the invention may have multiple applications. It is possible, for example, to take into account differences between the speed values from certain prior time periods, and to calculate a time function from these differential values by means of interpolation. Thus, a point in time for the matching of the speeds can then be predicted by extrapolation. In this case, the adaptation value would be a differential value of the speeds, calculated from the time function in such manner that, when the predetermined limit value is reached, it causes a locking of the gear precisely at that time, taking into account a gear-specific time delay (idle time) when the speeds become equal.

In an advantageous further development of the invention, the adaptation value has at least a component which depends on the difference between the speeds. Thus, a very simple calculation is possible.

In another advantageous further development of the invention, the adaptation value has at least one component which depends on the derivative of the difference between the speeds. Moreover, a combination of these last two mentioned further developments of the invention is also advantageous. One advantage of this combination is that a prediction on the expected coinciding of the speeds can be made, so that possible idle times which may occur in actuating the locking device can be taken into account. As a result, it is not necessary to store a great number of values from a past time period.

It is possible to apply the invention in combination with an equalizing gear, which is located between the wheels of a vehicle axle, as well as with a power divider, which is located between two vehicle axles, e.g., in a vehicle with all-wheel drive. The same type of gear, preferably a differential gear, is often used for both the equalizing gear and the power divider. The locking device is then called a differential lock. In addition, other types of locking devices are also possible.

In another advantageous further development of the invention, the braking device causes a braking of its individually assigned rotating part, whereby the braking force can be adjusted. This makes it possible to obtain an especially fine-tuned, stepped adaptation of the speeds to each other, even when the difference between the speeds is very large. It is especially advantageous when braking systems assigned to the synchronized wheels of a motor vehicle can be used directly. Since such braking systems are generally already present in motor vehicles, the present invention can be used at little additional cost and in many different ways; in particular, in motor vehicles with a system for drive slip regulation (ASR).

In another advantageous further development of the invention, the braking device and/or the locking device is actuated only when an auxiliary value exceeds an assigned auxiliary limit value. When applying the invention to a vehicle, the auxiliary value represents a measure of the drive slip of a wheel. In order to determine the auxiliary value, a vehicle velocity sensor signal, or the speed signals of wheels of a non-driven axle, preferably the steerable axle of the vehicle, can be used. By taking the auxiliary value into account, it is possible during turns, especially in tight turns, to prevent unwanted actuation of the braking devices and/or the locking device.

SUMMARY OF THE INVENTION

In accordance with an illustrative embodiment of the present invention, a method for the synchronization of two rotating parts, as are used in a motor vehicle, combines the actuation of individual braking devices and a common locking device on the two rotating parts. The inventive method is as follows:

a) measuring the respective speeds of the two rotating parts to determine a difference value between the speeds, b) monitoring this difference value to ascertain a predetermined maximum difference value limit between the speeds, c) upon recognition of this predetermined maximum difference value limit, causing the speeds to approach each other by actuating a braking device on at least one of the rotating parts, d) monitoring the speeds to evaluate their tendency to approach each other, and e) synchronizing the two rotating parts by actuating the locking device, at the time when the approach tendency reaches a predetermined minimum limit value.

As individual braking devices any devices which are individually associated with the rotating parts can be used, for example friction brakes which are normally associated with the wheels of a vehicle, an endurance brake or retarder, or an engine brake, can be used. The common locking device has to be designed in a way that upon actuation of the locking device the two rotating parts are coupled together, thereby synchronizing the two rotating parts. The synchronization can be achieved in an interlocking manner, if, for example, a claw coupling for rigid connection between the rotating parts is used, or in a non-interlocking manner, if for example, a friction clutch is used.

An illustrative embodiment of the present invention is more fully described below in conjunction with the following drawings.

DETAILED DESCRIPTION OF THE INVENTION

Figure 1:
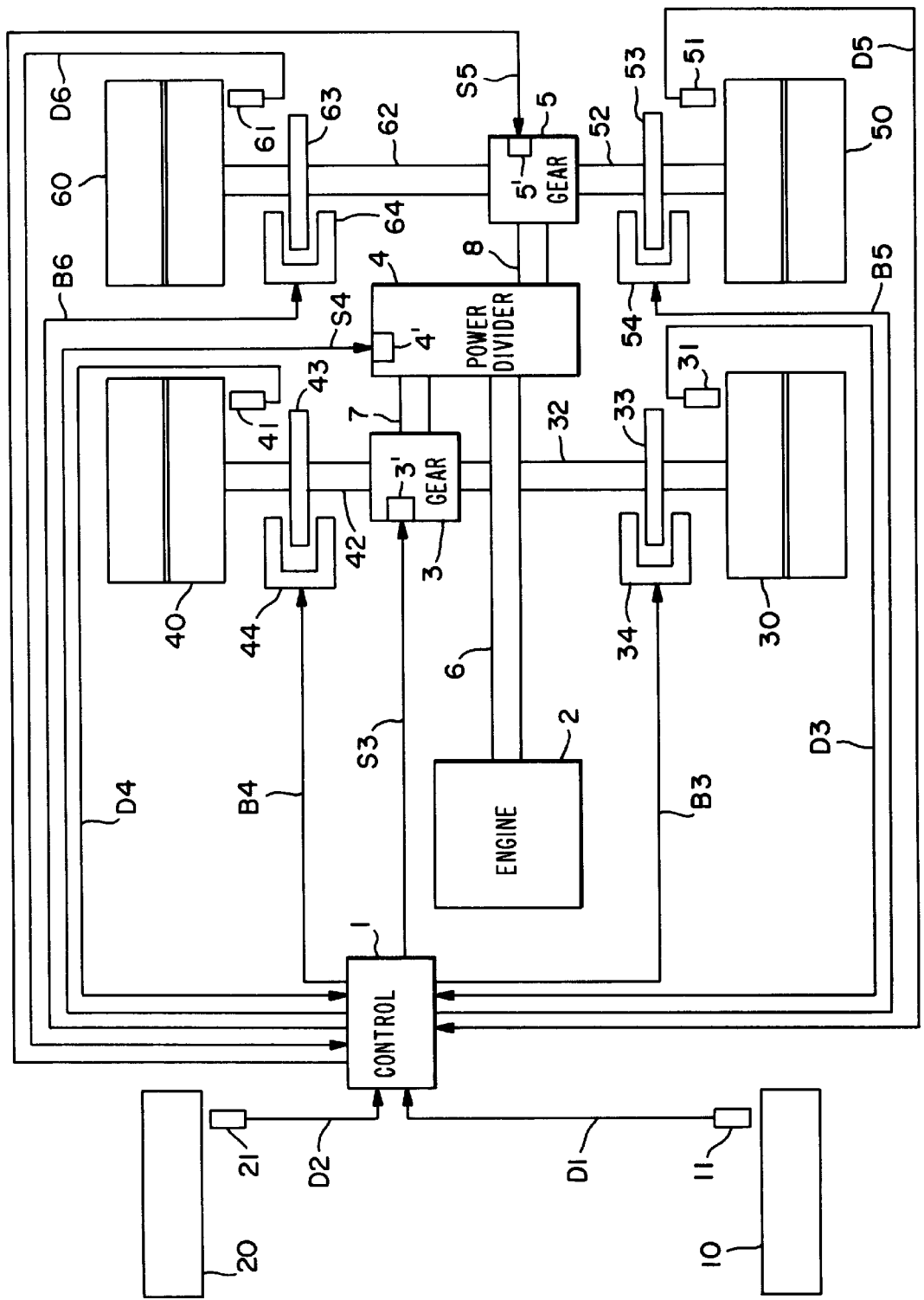
FIG. 1 shows the schematic layout of a motor vehicle in accordance with the invention.

FIG. 1 shows several components of a motor vehicle in which the inventive method is used several times. The inventive method is carried out by an electronic control device (1), which includes a microprocessor containing the inventive method as a part of a control program.

The vehicle of FIG. 1 is equipped with wheels (10, 20, 30, 40, 50, 60). The wheels (10, 20) serve to steer the vehicle and are not driven. These wheels are normally located on the front axle of a vehicle. The wheels (30, 40, 50, 60) are drive wheels, and are driven indirectly by the engine (2). These wheels are installed in pairs on two drive axles, usually the rear axles of the vehicle. The vehicle shown in FIG. 1 is thus a three-axle vehicle with two drive axles, e.g., a truck.

Each of the drive wheels (30, 40, 50, 60) is rigidly connected to a drive axle (32, 42, 52, 62), and with part of a braking system (33, 43, 53, 63). Each drive wheel (30, 40, 50, 60) is furthermore assigned an additional part (34, 44, 54, 64) of the braking system, which is designed to interact with that part of the braking system which is rigidly connected to the drive wheel, and which is able to exert a braking force on the respective drive wheel when actuated by an actuating signal (B3, B4, B5, B6). A braking pressure can be used as the actuating signal (B3, B4, B5, B6). It is also possible to use an electric signal.

To determine the speeds of the wheels (10, 20, 30, 40, 50, 60), each wheel is associated with a speed sensor (11, 21, 31, 41, 51, 61). The speed sensors can be designed, e.g., in the form of an electromagnetically acting impulse speed transmitter, which interacts with a toothed wheel installed rigidly on the respective wheel for the production of impulses. The speed sensors transmit speed signals (D1, D2, D3, D4, D5, D6) to the control device (1). Hereinafter, it is assumed that the speed signals (D1, D2, D3, D4, D5, D6) are already available in corrected condition, due to possible differences in the sizes of the drive wheels, e.g., due to tire tolerances. A suitable method for this is known, e.g., from DE 41 14 047 A1, which is incorporated herein by reference.

The driving force of the engine (2) is transmitted in the form of a rotational movement, via the axles (6, 7, 8), the power divider (4), and the equalizing gears (3, 5), to the driven axles (32, 42, 52, 62). The gears (3, 4, 5) serve to uncouple the rotational movement of the axles (32, 42, 52, 62) when the vehicle takes a curve, in order to avoid jamming and possible damage to the axles (32, 42, 52, 62) resulting therefrom. The same effect of these gears also occurs in the case of differences in size of the drive wheels due to tolerances.

The power divider (4) and the equalizing gears (3, 5) are constructed in the form of differential drives. They are equipped to lock their respective output shafts via a locking device (3', 4', 5'). A typical locking device is constructed in the form of a claw coupling for rigid connection of the drive axles. The input shaft of an equalizing gear is not influenced by this locking device. The locking, or actuation, of the claw coupling is triggered by a control signal (S3, S4, S5), associated with its corresponding differential drive, from control device (1). The actuating signal for locking may be in the form of a pressure signal or an electric signal.

The output shaft (6) of the engine (2) is connected to the input shaft of the power divider (4). Axles (7, 8) also serve as output shafts, which can be connected rigidly to each other as a result of control signal (S4) actuating the locking device (4').

The equalizing gear (3) utilizes the output shaft (7) of the power divider (4) as its input shaft. Axles (32, 42) serve as output shafts which can be connected rigidly to each other, as a result of the control signal (S3) actuating the locking device (3').

The output shaft (8) of the power divider (4) is utilized to drive the input shaft of the equalizing gear (5). Axles (52, 62), which can be connected rigidly to each other by actuating the locking device (5') by means of control signal (S5), are the output shafts of the equalizing gear (5).

The control device (1) receives the speed signals (D1, D2, D3, D4, D5, D6) and analyzes them in accordance with the inventive process. As a result of this analysis, the control device (1) transmits the actuating signals (B3, B4, B5, B6)

to the braking system of the drive wheels as needed. The control device (1) also transmits the control signals (S3, S4, S5) to the locking devices (3', 4', 5') of the differential gears (3, 4, 5).

The present invention can be used in a number of applications. Generally speaking, the speeds of two rotating parts, to which a common locking device and individually actuated braking devices are assigned, are herein determined and monitored continuously. When a large difference occurs between the speeds, the speed difference is reduced by actuating at least one of the braking devices. When a predetermined tendency to adapt level is recognized, the rotating parts are synchronized by actuating the locking device.

In a first application of the inventive process, the speed signals (D3, D4) are considered. It is assumed that the speed signal (D3) has the greater value. From these signals (D3, D4), a differential signal (ΔD) is calculated by subtraction:

$$\Delta D = D3 - D4 \qquad [1]$$

The differential signal (ΔD) is monitored until it reaches or exceeds a predetermined limit value (ΔDMAX).

To avoid erroneous actuation of the inventive process when the vehicle is traveling on tight curves, an auxiliary magnitude may be determined by using the speed signals (D1, D2). This auxiliary magnitude is then evaluated to ascertain whether it exceeds a predetermined auxiliary limit value. The generation of the actuating signals (B3, B4), or of the control signal (S3), is enabled only if the above-mentioned auxiliary limit value has been exceeded.

One method for determining the auxiliary magnitude utilizes the difference between the larger of the two speed signals of the driven wheels (in this example, D3), and the larger of the two speed signals (D1, D2) of the non-driven wheels. The auxiliary magnitude then represents a slip signal.

Upon reaching the speed difference limit value (ΔDMAX), and, if applicable, when the predetermined auxiliary limit value has been exceeded, the control device (1) transmits actuating signals (B3, B4) to the active parts (34, 44) of the braking system. This causes the differing speeds to adapt to each other. That is, wheel (30), with the higher speed (D3), is braked by means of the actuating signal (B3).

If, contrary to the above assumption, the speed signal (D3) does not have the larger value, the subtraction according to formula [1] would be carried out in the opposite sense (ΔD=D4−D3), so that the differential signal (ΔD) would again have a positive sign. In this case, the wheel (40) would be braked by means of the actuating signal (B4).

The actuation of the braking system can also be carried out within the framework of a so-called "differential braking regulation", which is part of a system for drive slip regulation of a motor vehicle. In this situation, it is possible to brake not only the wheel which rotates more rapidly, but, when a drive slip is recognized on both sides by means of a comparison with the speed signals (11, 21) of the non-driven wheels (10, 20), both drive wheels (30, 40) can be subjected to a braking force. Also, in the case of a differential braking regulation, the actuation of the braking system can be started before the recognition of the limit value (ΔDMAX), e.g., on the basis of a rapid rate of change of one of the speed signals (D3, D4), or of the speed difference (ΔD).

Upon reaching the limit value (ΔDMAX), an adaptation value (A) is determined continuously by control device (1), based on the differential signal (ΔD). This adaptation value (A) represents a measure of the adaptation or approach tendency of the speed signals (D3, D4). The adaptation value (A) is preferably established on the basis of the following formula:

$$A = K1 * \Delta D + K2 * d/dt(\Delta D) \qquad [2]$$

where K1 and K2 are computing constants.

The adaptation value (A) is continuously monitored to determine if it has reached a predetermined limit value (AMIN). When this limit value (AMIN) is reached, the control device (1) transmits a corresponding control signal (S3) to lock the equalizing gear (3), so that the axles (32, 42), and thereby also the wheels (30, 40), are rigidly connected to each other, and thus generate the same speed signals (D3, D4). In this manner, the process for the synchronization of the parts (30, 32, 33, 40, 42, 43) with the speed signals (D3, D4) is completed.

In similar fashion, as in the case of wheels (30, 40) and their appertaining parts (31, 32, 33, 34, 41, 42, 43, 44), the inventive method can also be used in a second application for wheels (50, 60), and the parts (51, 52, 53, 54, 61, 62, 63, 64) connected thereto. The signals (D5, D6) are then used as the speed signals, and the signals (S5, B5, B6) are used as control signals and actuating signals, respectively.

In a third application of the inventive process, the axles (7, 8) are considered as rotating parts to be synchronized. This synchronization takes place via the locking device (4') installed in the gear (4), which is actuated from the control device (1) by means of the control signal (S4). The braking devices (33, 34, 43, 44, 53, 54, 63, 64) associated with the different wheels (30, 40, 50, 60, respectively) are actuated in pairs, or by axle, in this application. In this case, in order to decrease the speed of the axle (7), the control device (1) utilizes the actuating signals (B3, B4). To decrease the speed of the axle (8), the actuating signals (B5, B6) are used in an analogous fashion.

The speeds of the axles (7, 8) are not detected directly by speed sensors associated with these parts. Instead, these axle speeds are calculated by the control device (1), based on the speed signals (D3, D4, D5, D6). The speed of the axle (7) is derived as an arithmetic mean value from the speed signals (D3, D4). The speed of the axle (8) is calculated in analogous fashion as the arithmetic mean value of the speed signals (D5, D6).

The inventive method in this third application is then carried out in the manner previously described for the first application. In different applications, different limit values (ΔDMAX, AMIN), and different computing constants (K1, K2), can be used for the respective adaptation values. Suitable values for these parameters are:

Gear (3): (ΔDMAX) = 1 m/s    AMIN = 5 m/s
          K1 = 5              K2 = 0.2 s Gear (4): (ΔDMAX) = 1 m/s    AMIN = 10 m/s
          K1 = 5              K2 = 0.2 s Gear (5): (ΔDMAX) = 1 m/s    AMIN = 5 m/s
          K1 = 5              K2 = 0.2 s In short, a method and apparatus are disclosed for the synchronization of two or more rotating parts, in particular for a motor vehicle. Moreover, the disclosed method and apparatus can be applied safely in widely varying speed differential situations between the rotating parts.

The above described embodiments of the invention are intended to be illustrative only. Numerous alternative embodiments may be devised by those skilled in the art without departing from the spirit and scope of the following claims.

What is claimed is:

1. A method for the synchronization of two rotating parts in a motor vehicle with individual braking devices and a common locking device associated with said two rotating parts, comprising the steps of:
   a) measuring the respective speeds of said two rotating parts to determine a difference value between said speeds,
   b) monitoring said difference value to ascertain a predetermined maximum difference value limit between said speeds,
   c) upon recognition of said predetermined difference value limit, causing said speeds to approach each other by actuating one of said braking devices on at least one of said rotating parts,
   d) monitoring said speeds to evaluate their tendency to approach each other,
   e) wherein when said approach tendency reaches a predetermined minimum limit value, synchronizing said two rotating parts by actuating said locking device.

2. The method as in claim 1, wherein an adaptation value (A) is calculated from said speeds of said two rotating parts, said value (A) representing a measure of the tendency of said speeds to approach each other, said locking device being actuated to synchronize said two rotating parts when said adaptation value (A) reaches said predetermined minimum limit value.

3. The method as in claim 2 wherein said adaptation value (A) includes a component which depends on the difference value between said speeds.

4. The method as in claim 2 wherein said adaptation value (A) includes a component which depends on the derivative with respect to time of the difference value between said speeds.

5. The method as in claim 1, wherein:
   an adaptation value (A) is calculated from said speeds of said two rotating parts, said adaptation value (A) representing a measure of the tendency of said speeds to approach each other, and wherein said adaptation value (A) is calculated from the following formula:

$A = K1 * \Delta D + K2 * d/dt(\Delta D)$ where K1 and K2 are computing constants, and $\Delta D$ is said difference value between said speeds.

6. The method as in claim 1, wherein said braking device applies an adjustable braking force to at least one of said rotating parts.

7. The method as in claim 1, further comprising the following steps:
   f) monitoring an auxiliary value which represents a measure in a vehicle for the drive slip of a wheel,
   g) setting an auxiliary value limit,
   h) actuating said braking and locking devices only when said auxiliary value exceeds said auxiliary value limit.

8. An apparatus for the synchronization of two rotating parts in a motor vehicle comprising:
   a) speed sensors, each individually associated with said rotating parts, for measuring the rotational velocity of each said rotating part, and for generating output signals therefrom, individually representative of each said rotational velocity,
   b) braking devices, each individually associated with said rotating parts,
   c) a locking device, commonly associated with said rotating parts,
   d) a control device, for receiving said output signals from said speed sensors, and for outputting actuating signals to said braking devices and said locking device, said control device for calculating a speed difference between said rotating parts,
   e) wherein when said control device ascertains that said speed difference reaches a predetermined maximum limit value, said control device actuates at least one of said braking devices to cause said speeds to have a tendency to approach each other, and
   f) wherein when said control device further ascertains that said approach tendency of said speeds has reached a predetermined mimimum limit value, said control device actuates said locking device.

9. The apparatus as in claim 8, wherein said braking device applies an adjustable braking force to at least one of said rotating parts.

10. The apparatus as in claim 8 wherein said braking and locking devices cause the synchronization of the wheels of a vehicle axle, as in transversal locking.

11. The apparatus as in claim 8 wherein said braking and locking devices cause the synchronization of two axles of a vehicle, as in longitudinal lock.

12. The apparatus as in claim 8 wherein said locking device is an equalizing gear.

13. The apparatus as in claim 8 wherein said locking device is a power divider.

14. The apparatus as in claim 8 wherein said actuating signals outputted from said control device are enabled only when the drive slip of a motor vehicle wheel exceeds a predetermined value.

* * * * *